United States Patent
Fukushima et al.

(10) Patent No.: US 6,639,602 B1
(45) Date of Patent: Oct. 28, 2003

(54) IMAGE DATA DEMODULATION APPARATUS AND METHOD THEREOF

(75) Inventors: Michihiro Fukushima, Yokohama (JP); Shuji Abe, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/389,215

(22) Filed: Sep. 3, 1999

(30) Foreign Application Priority Data

Sep. 3, 1998 (JP) .......................................... 10-249862

(51) Int. Cl.⁷ ................................................ G09G 5/39
(52) U.S. Cl. ........................ 345/531; 345/555; 386/37; 386/45; 386/123; 386/126
(58) Field of Search ................................ 345/503, 520, 345/531, 545, 555; 375/240.01, 240.04, 240.05, 240.24, 240.25, 240.29; 386/33, 37, 40, 42, 45, 109, 123, 124, 125, 126

(56) References Cited

U.S. PATENT DOCUMENTS

| | | | | |
|---|---|---|---|---|
| 5,699,474 A | * | 12/1997 | Suzuki et al. | 386/111 |
| 5,754,241 A | * | 5/1998 | Okada et al. | 375/240.05 |
| 5,815,634 A | * | 9/1998 | Daum et al. | 348/515 |
| 5,841,472 A | * | 11/1998 | Rim et al. | 375/240.25 |
| 5,874,995 A | * | 2/1999 | Naimpally et al. | 348/715 |
| 5,999,696 A | * | 12/1999 | Tsuga et al. | 386/125 |
| 6,097,758 A | * | 8/2000 | Monnier | 375/240 |
| 6,122,662 A | * | 9/2000 | Emura | 709/219 |
| 6,259,740 B1 | * | 7/2001 | Lyu | 375/240.25 |

FOREIGN PATENT DOCUMENTS

JP          9-261630           10/1997

OTHER PUBLICATIONS

LeGall, D. MPEG: A Video Compression Standard For Multimedia Applications. Communications of the ACM vol. 34, No. 4, Apr. 1991, pp 47–58.*

* cited by examiner

Primary Examiner—Ulka J. Chauhan
(74) Attorney, Agent, or Firm—Pillsbury Winthrop LLP

(57) ABSTRACT

An image data demodulation apparatus comprises an input control portion for turning ON/OFF input of an encoded image data corresponding to a control signal, a detecting circuit for detecting a sequence header from the encoded image data supplied therefrom, a data extracting portion for, when the sequence header is detected, extracting a predetermined data about the kind of image data from the encoded image data, a control circuit for supplying the control signal to the input control portion based on the detected sequence header and the predetermined data so as to control ON/OFF of the input control portion and a demodulation circuit. As a result, if the type of the encoded image data is changed, this is detected and an input is temporarily stopped so as to secure a new memory region corresponding to the image type.

14 Claims, 3 Drawing Sheets

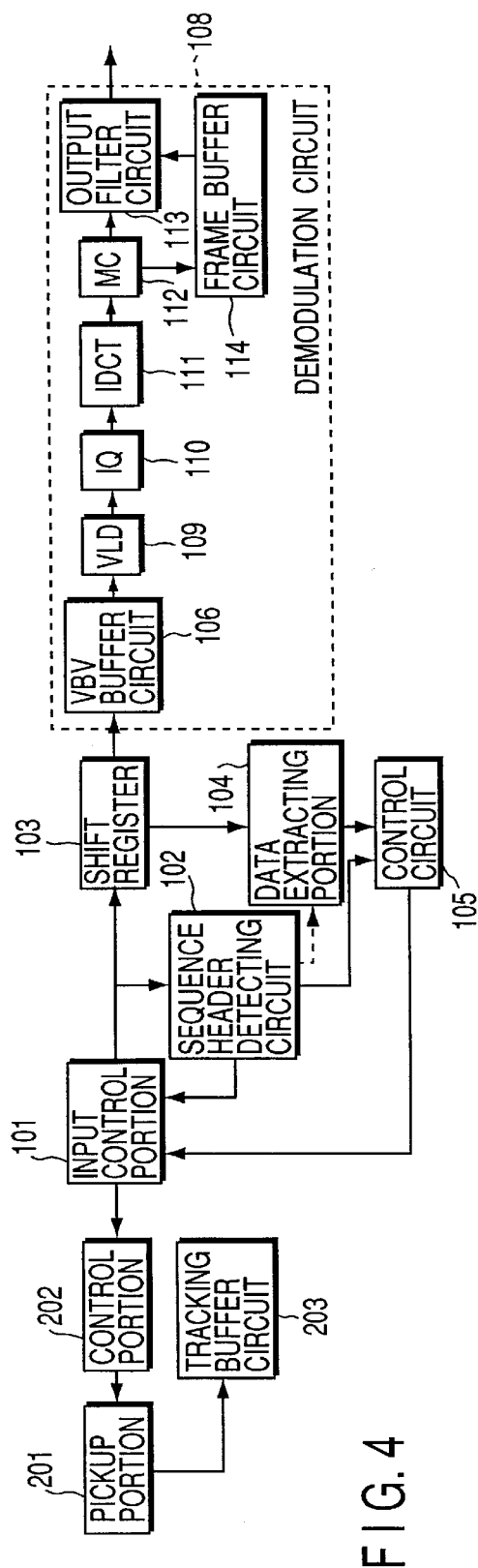
F I G. 4
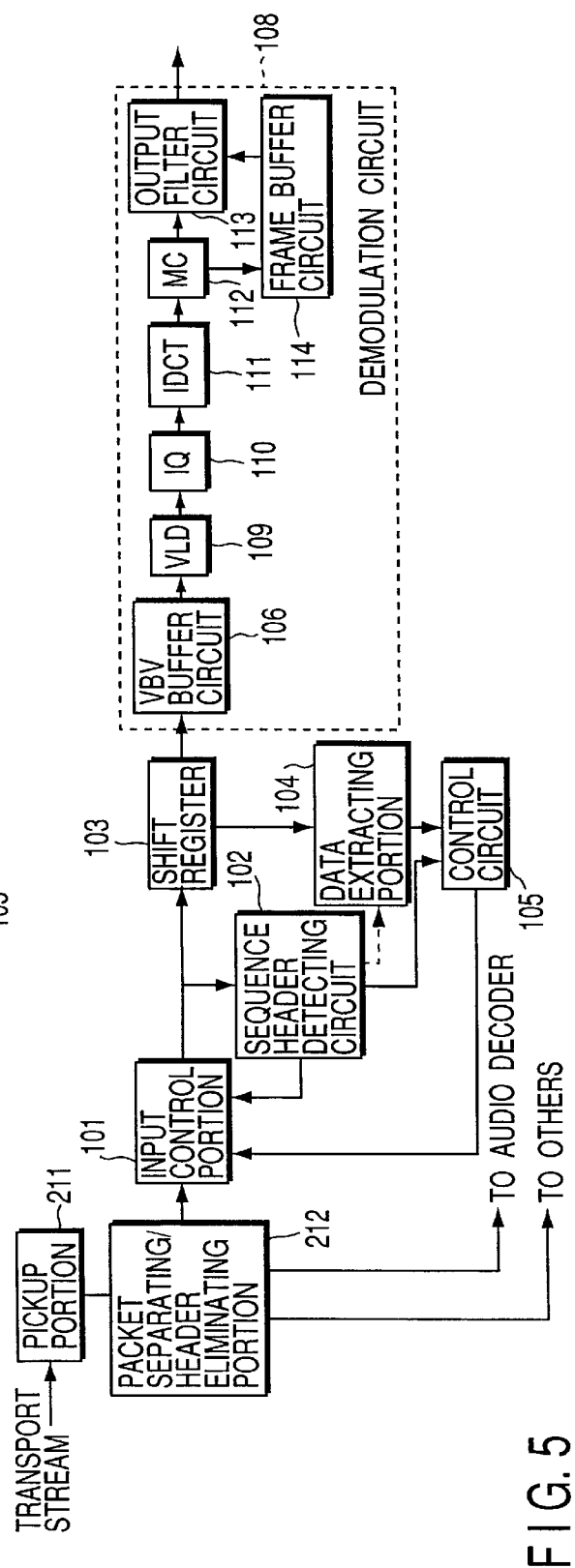
F I G. 5

IMAGE DATA DEMODULATION APPARATUS AND METHOD THEREOF

BACKGROUND OF THE INVENTION

The present invention relates to a processing method for compressed image data and an apparatus thereof, and more particularly to a method and apparatus for demodulating a bit stream based on MPEG normal standard and outputting the same on a screen in an display order.

Recently, in an image processing apparatus, image data has been often encoded according to the MPEG normal standard and then processed. In such an image processing apparatus, an image data demodulating circuit needs to be provided for demodulating the image data encoded by the MPEG.

When the image data encoded by the MPEG is demodulated in the image data demodulating circuit and outputted on a display screen, inputted bit stream is stored in succession in video buffering verifier (VBV) buffer and the bit stream is read out in succession and after variable length demodulation, inverse quantization, inverse DCT and motion compensation are carried out, it is stored in a frame buffer. Then, that bit stream is read out from the frame buffer and outputted on the display screen. Here, the VBV buffer and frame buffer are secured on the same RAM.

Although there is no problem in the above conventional method if the image size of the inputted bit streams is constant, if bit streams (the VBV buffer size and frame buffer size are also different) different in the image size are continuously inputted, there occurs a necessity of allocating a memory region on a RAM corresponding to a maximum image data which can be inputted, so as to secure a VBV buffer and frame buffer preliminarily.

Unless the VBV buffer and frame buffer are secured corresponding to the maximum image data, when the bit stream of an image size different from a currently demodulating image size is inputted and consequently, the buffer size needs to be changed, there occurs a problem that data within the VBV buffer and data within the frame buffer may be destroyed when each buffer size is changed, so that an error occurs in an reproduced image thereby the reproduced image being not beautiful to see.

BRIEF SUMMARY OF THE INVENTION

It is an object of the invention to provide an image data demodulation apparatus which interrupts fetching of image data if the image type is changed and after a memory capacity of a VBV buffer corresponding to the size of image is automatically set up, carrying out storage processing for the image data.

To achieve the above object, the present invention provides an image data demodulation apparatus comprising input control means for controlling ON/OFF of an input of encoded image data corresponding to a given control signal; detecting means for detecting a sequence header from the encoded image data supplied from the input control means; extracting means for, when the detecting means detects the sequence header from the encoded image data supplied from the input control means, detecting a predetermined data about the kind of image data from the encoded image data supplied from the input control means; storage means for storing the encoded image data supplied from the input control means in a memory region; control signal output means for outputting the control signal and supplying the control signal to the input control means based on the sequence header detected by the detecting means and the predetermined data extracted by the extracting means; and demodulation means for demodulating the encoded image data stored in the memory region of the storage means.

According to the present invention having such a structure, if the image type is changed, this is read from the sequence header and fetching of the image is interrupted immediately. Then, data corresponding to the image type is extracted from the image data so as to secure a memory region corresponding to the image type. As a result, a possibility that data within the buffer is destroyed by a change in the buffer size is eliminated unlike in the prior art.

Further, in the image data demodulation method of the present invention as well, because of the same gist, even if the image type is changed, destruction of data can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram of an optical disk reading apparatus of the present invention; and FIG. 5 is a block diagram of a broadcasting receiving unit of the present invention.

DETAILED DESCRIPTION OF THE INVENTION

Hereinafter, the embodiments of the present invention will be described in detail with reference to the accompanying drawings.

Figure 1:
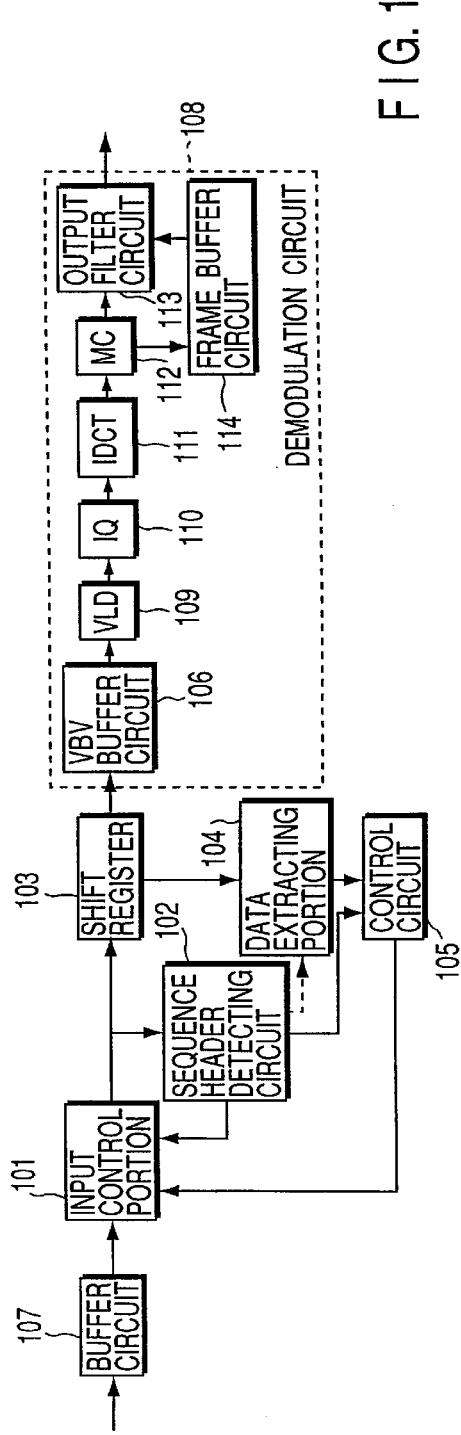
FIG. 1 is a block diagram showing an image demodulation apparatus of the present invention.

FIG. 1 is a block diagram of an image demodulation apparatus of the present invention.

Referring to FIG. 1, the image demodulation apparatus is provided, for example, in the back of a tuning portion of a digital TV unit so as to demodulate an MPEG signal, and comprises a buffer circuit 107, an input control portion 101 connected thereto, a sequence header detecting circuit 102 connected thereto, a shift register circuit 103 connected thereto, a data extracting portion 104 connected thereto and a control circuit 105 connected thereto. Further, it includes a demodulating circuit 108, which comprises a VBV buffer circuit 106, a VLD circuit 109 connected thereto, an IQ circuit 110 connected thereto, an IDCT circuit 111 connected thereto, an MC circuit 112 connected thereto, a frame buffer circuit 114 connected thereto and an output filter circuit 113 connected thereto.

With such a configuration, an operation, which will be described later is carried out. That is, inputted image data is inputted to the shift register circuit 103 through the input control portion 101. The data inputted to this shift register is delayed by a predetermined number of stages in the shift register and outputted to the VBV buffer circuit 106 of the demodulating circuit 108.

In the demodulating circuit 108, data is read out from the VBV buffer and subjected to variable length demodulation, inverse quantization, inverse DCT and motion compensation and then a demodulated image is stored on the frame buffer. This stored demodulated image is read out from the frame buffer in the order of displays and outputted to an image display unit such as a monitor through an output filter.

On the other hand, the sequence header detecting circuit 102 detects a sequence start code (00, 00, 01, B3) from data inputted from the shift register 103 through the input control portion 101.

Figure 2:
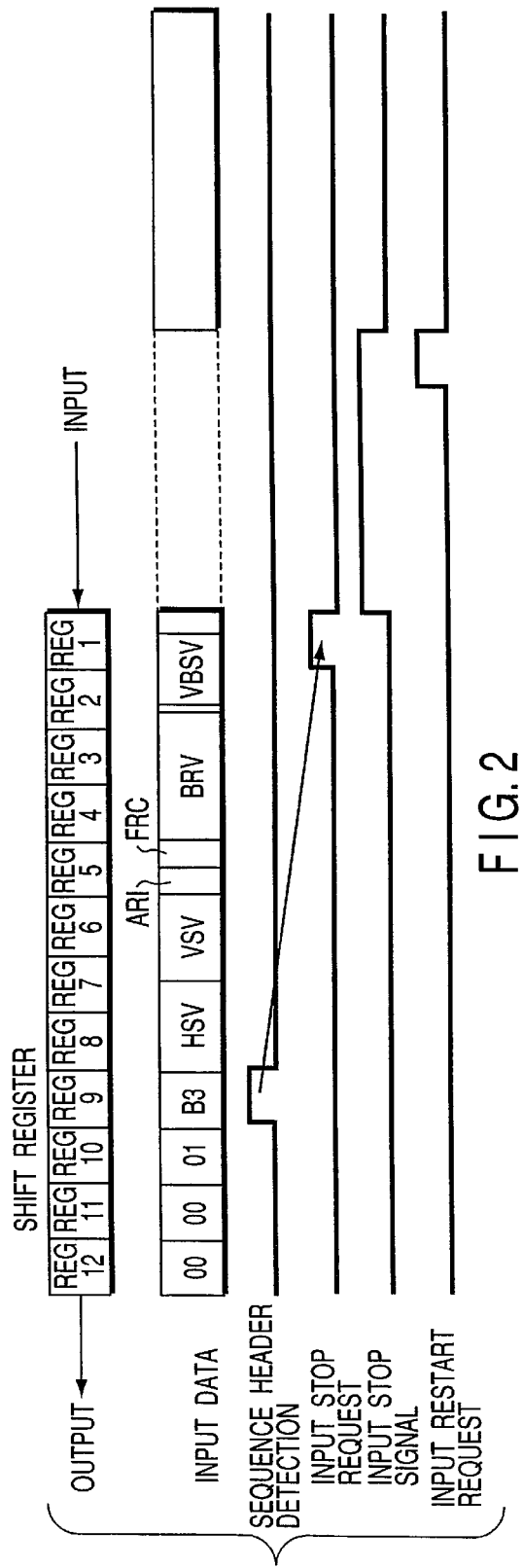
FIG. 2 is a diagram for extracting information for calculating a VBV buffer size from a sequence header.

If a sequence header is detected in the sequence header detecting circuit 102, an input stop signal is outputted to the input control portion 101 after a predetermined timing as shown in FIG. 2, so that data input is stopped.

If the sequence header is detected so that the data input is stopped, a part of the sequence header is left in the shift register 103 (in this case, 12 stages) as shown in FIG. 2 and a content of this sequence header is extracted by the data extracting portion 104 and outputted to the control circuit 105.

The control circuit 105 computes a VBV buffer size necessary for demodulating the inputted image data based on the extracted information (pixel size, etc.) from the sequence header so as to control the VBV buffer (in change of size, securing other region, etc.)

If data input is stopped by the input control portion 101, in case of an input from such an accumulative media such as DVD, this is handled by stopping reading of data from a disk or tape. In case of broadcasting, this requirement is achieved by provision of the buffer circuit 107 in front of the input control portion. This may be shared by a data buffer which is mounted if a transport processing portion on the input stage provided for broadcasting is constructed in software processing.

Although, according to the above described method, the data extracting portion 104 extracts information from the sequence header from the shift register circuit 103, it is permissible to prepare a register within the data extracting portion 104 separately from the shift register 103 and extract the sequence header information with sequence header detecting timing as a standard.

Next, according to a second embodiment of the present invention, the image data encoded by the MPEG is subjected to demodulation processing. An operation of the control circuit 105 in a case where image data encoded by a MPEG different in image size is continuously inputted will be described with reference to FIG. 3.

Figure 3:
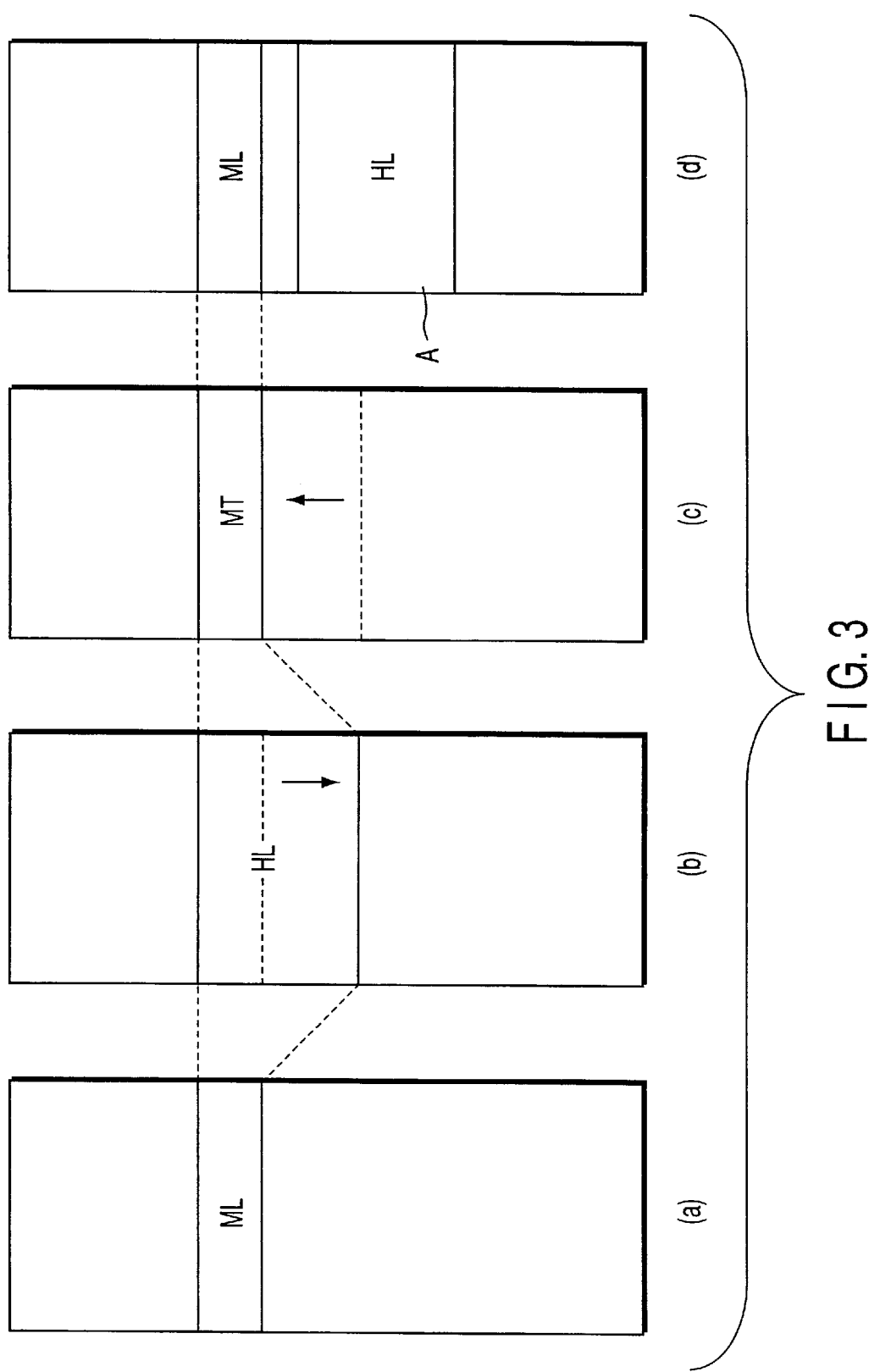
FIG. 3 is a diagram showing a change of the VBV buffer size according to the present invention.

FIG. 3 shows an example indicating how the storage area of the VBV buffer circuit will be used. (a) indicates a case where a region for MP@ML is secured and (b) indicates a case where this region is enlarged to a region for MP@HL. Next, (c) indicates a case where the region for MP@HL is reduced to the region for MP@ML.

Further, (d) indicates a case where a new header for MP@HL is detected from the region for the MP@ML or a case where the region for MP@ML is not overwritten unlike (b) but a region A having a fitting size is provided in another region.

If an encoded image data having a different image size is inputted and data input is interrupted by detecting a sequence header in the sequence header detecting portion, the control circuit 105 calculates the VBV buffer size based on information concerning to the demodulated image extracted through the data extracting portion. If a VBV buffer size required when this newly inputted image data is demodulated is smaller than a currently secured VBV buffer size, the VBV buffer necessary for demodulating the newly inputted image data is secured on a RAM in the demodulating circuit.

However, if the buffer size is larger than the currently secured VBV buffer size, it is preferable to secure a new VBV buffer. If larger, as shown in (d) on FIG. 3, a new region A is provided.

If the new VBV buffer is secured, the control circuit 105 requests the input control portion 101 for restart of data input and instructs to write image data of a new image size into the newly secured VBV buffer.

If demodulation of the image data written into the VBV buffer secured since before is completed, this VBV buffer region is released and the demodulating circuit 108 reads out data from the newly secured VBV buffer so as to start the demodulation.

Next, according to a third embodiment of the present invention, the image data encoded by the MPEG is subjected to the demodulating processing. An operation of the control circuit 105 in a case where image data encoded by a MPEG different in image size is continuously inputted will be described.

If the encoded image data different in image size is inputted and the sequence header is detected at the sequence header detecting portion so that data input is stopped, the control circuit 105 calculates a VBV buffer size based on information concerning to the demodulated image extracted through the data extracting portion. If the VBV buffer size required when this newly inputted image data is demodulated is smaller than the currently secured VBV buffer size, the control circuit 105 stops data input into the input control portion 101 until demodulation of image data written in the currently secured VBV buffer is completed.

If the demodulation of the image data written in the currently secured VBV buffer is completed, this VBV buffer region is released so as to secure a VBV buffer necessary for demodulating a newly inputted image data.

If the new VBV buffer is secured, the control circuit 105 requests the input control portion 101 to restart data input and instructs to write image data of new image size into the newly secured VBV buffer. The demodulating circuit 108 reads out data from this newly secured VBV buffer so as to start demodulation.

Next, according to a fourth embodiment of the present invention, the image data encoded by the MPEG is subjected to the demodulating processing. An operation of the control circuit 105 in a case where the image data encoded by a MPEG different in image size is continuously inputted will be described.

If the encoded image data different in image size is inputted and a sequence header is detected by the sequence header detecting portion so that data input is stopped, the control circuit 105 calculates a VBV buffer size based on information concerning to the demodulated image extracted through the data extracting portion. If the VBV buffer size required when this newly inputted image data is demodulated is smaller than a currently secured VBV buffer size, the control circuit 105 stops an image demodulating operation and releases the currently secured VBV buffer. As a result, a VBV buffer necessary for demodulating the newly inputted image data is secured.

If the new VBV buffer is secured, the control circuit 105 request the input control portion 101 to restart data input and instructs to write image data of a new image size into the newly secured VBV buffer. The demodulating circuit 108 reads out data from this newly secured VBV buffer and starts the demodulating operation.

Next, a fifth embodiment of the present invention will be described with reference to FIG. 4. The fifth embodiment indicates a case where the present invention is applied to an optical disk reading apparatus. FIG. 4 is a block diagram of an optical disk reading apparatus of the present invention.

The optical disk reading apparatus shown in FIG. 4 has substantially the same structure, which enables to secure a memory region appropriately depending on a signal type.

Namely, this optical disk reading apparatus comprises a pickup portion 201, a control portion 202 for controlling the same, a tracking buffer circuit 203 supplied with a picked-up image signal from the pickup portion, an input control portion 101 for supplying an image signal and the like, and has substantially the same structure as the image demodulation apparatus shown in FIG. 1.

In this optical disk reading apparatus as well, a change of the type of an image signal picked up by the pickup portion is detected by detecting of the sequence header. After the input is temporarily interrupted, a memory region such as a buffer region is secured depending on the type of an image and after that, input of an image is restarted. Therefore, it is possible to avoid deficiency such as image distortion due to destruction of image data.

Next, a sixth embodiment of the present invention will be described with reference to FIG. 5. The sixth embodiment indicates a case where the present invention is applied to a broadcasting receiving apparatus, and FIG. 5 is a block diagram of the broadcasting receiving apparatus according to the present invention.

In the configuration of the broadcasting receiving apparatus shown in FIG. 5, this broadcasting receiving apparatus also comprises a buffer circuit 211 for receiving a transport stream, a packet separating/header eliminating portion 212 connected thereto, an input portion 101 for receiving an encoded image data therefrom and the like. This broadcasting receiving apparatus has substantially the same structure as the image shown in FIG. 1.

In this broadcasting receiving apparatus also, if the kind of an image in encoded image data provided as a broadcasting signal is changed halfway, this is recognized by detecting the sequence header and after that, input of the encoded image data is interrupted immediately. If it is confirmed that a memory region necessary depending on the kind of an image has been secured, the input of image is restarted. As a result, even if the kind of the image is changed halfway, there never occurs a distortion of the image unlike before, so that a smooth image reproduction can be achieved.

According to the present invention, as described above in detail, in case where bit streams each having a different image size are inputted continuously, even if a VBV buffer size and frame buffer size are not secured corresponding to maximum image data which can be inputted, a change of each buffer size and demodulation of an image can be carried out without destroying input data both before and after an image data incontinuous in image size when a method mentioned in claims 5, 6 is applied or only after an image data incontinuous in image size when a method mentioned in claim 7 is applied.

That is, according to the present invention, by providing with the input control portion or a sequence header detecting circuit, when a header is detected, input of the image data is interrupted and a buffer region corresponding to the detected size is secured. As a result, a change of each buffer size and demodulation of the image can be carried out without destroying the input data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image data demodulation apparatus comprising:

input control means for controlling an input of an encoded image data;

detecting means for detecting a sequence header from the encoded image data supplied from the input control means and outputting an input stop signal if the sequence header is detected;

delaying means for delaying the encoded image data supplied from the input control means;

extracting means for, when the detecting means detects the sequence header from the encoded image data supplied from the input control means, extracting a data corresponding to an image type from the encoded image data delayed by the delaying means;

storage means for storing the encoded image data supplied from the delaying means in a first region in a memory region, the first region having a predetermined buffer size;

control means for controlling the input control means to interrupt the input of the encoded image data corresponding to the input stop signal, calculating a buffer size necessary for demodulating the encoded image data based on the data corresponding to the image type extracted by the extracting means, comparing the calculated buffer size with the predetermined buffer size and when the calculated buffer size and the predetermined buffer size of the first region is different, securing a second region in the memory region, and controlling the input control means so as to restart the input of data into the second region; and demodulation means for demodulating the encoded image data stored in the second region of the storage means.

2. An image data demodulation apparatus according to claim 1, wherein the data corresponding to the image type is pixel size necessary for calculating the memory region of the storage means.

3. An image data demodulation apparatus according to claim 1, further comprising:

reading means for reading the enclosed image data stored in an optical disk and supplying the enclosed image data to the input control means.

4. An image data demodulation apparatus according to claim 1, further comprising:

a tuning portion for tuning a transport stream which is a broadcasting signal, and supplying the tuned transport stream as the encoded image data to the input control means.

5. An image data demodulation apparatus according to claim 1, further comprising:

control means for comparing the calculated buffer size with the predetermined buffer size and when the calculated buffer size and the predetermined buffer size of the first region is different, after a remainder of the encoded image data stored in the current memory region is deleted, securing a second region in the memory region, and controlling the input control means so as to restart the input of data into the second region.

6. An optical disk data reading apparatus comprising:

input control means for controlling an input of an encoded image data;

detecting means for detecting a sequence header from the encoded image data supplied from the input control means and outputting an input stop signal if the sequence header is detected;

delaying means for delaying the encoded image data supplied from the input control means;

extracting means for, when the detecting means detects the sequence header from the encoded image data supplied from the input control means, extracting a data corresponding to an image type from the encoded image data delayed by the delaying means;

storage means for storing the encoded image data supplied from the delaying means in a first region in a memory region, the memory region having a predetermined buffer size;

control means for controlling the input control means to interrupt the input of the encoded image data corresponding to the input stop signal, calculating a buffer size necessary for demodulating the encoded image data based on the data corresponding to the image type extracted by the extracting means, comparing the calculated buffer size with the predetermined buffer size and when the calculated buffer size and the predetermined buffer size in the storage means is different, after the encoded image data stored in the current memory region is read out and the current memory region is released, securing a second region in the memory region, and controlling the input control means so as to restart the input of data into the second region; and demodulation means for demodulating the encoded image data stored in the memory region.

7. An image data demodulation apparatus according to claim 6, wherein the data corresponding to the image type is pixel size necessary for calculating the memory region of the storage means.

8. An image data demodulation apparatus according to claim 6, further comprising:

reading means for reading the enclosed image data stored in an optical disk and supplying the enclosed image data to the input control means.

9. An image data demodulation apparatus according to claim 6, further comprising:

a tuning portion for tuning a transport stream which is a broadcasting signal, and supplying the tuned transport stream as the encoded image data to the input control means.

10. An image data demodulation method comprising:

controlling an input of an encoded image data;

detecting a sequence header from the inputted encoded image data, and outputting an input stop signal if the sequence header is detected;

delaying the inputted encoded image data;

extracting a data corresponding to an image type from the delayed encoded image data, when the sequence header is detected from the inputted encoded image data;

storing the delayed encoded image data in a first region in a memory region, the memory region having a predetermined buffer size;

controlling the input controlling to interrupt the input of the encoded image data corresponding to the input stop signal, calculating a buffer size necessary for demodulating the encoded image data based on the data corresponding to the extracted image type, comparing the calculated buffer size with the predetermined buffer size and when the calculated buffer size and the predetermined buffer size of the first region is different, after the encoded image data stored in the current memory region are read out and the current memory region is released, securing a second region in the memory region, and controlling the input so as to restart the input of data into the second region; and demodulating the encoded image data stored in the memory region.

11. An image data demodulation method according to claim 10, wherein the data corresponding to the image type is pixel size necessary for calculating the memory region of the storage means.

12. An image data demodulation method according to claim 10, further comprising:

reading the enclosed image data stored in an optical disk and supplying the enclosed image data to the input controlling.

13. An image data demodulation method according to claim 10, further comprising:

tuning a transport stream which is a broadcasting signal, and supplying the tuned transport stream as the encoded image data to the input controlling.

14. An image data demodulation method according to claim 10, further comprising:

comparing the calculated buffer size with the predetermined buffer size and when the calculated buffer size and the predetermined buffer size of the first region is different, after a remainder of the encoded image data stored in the current memory region is deleted, securing a second region in the memory region, and controlling the input so as to restart the input of data into the second region.

* * * * *